United States Patent
Yu et al.

(10) Patent No.: US 9,350,403 B2
(45) Date of Patent: May 24, 2016

(54) RECEIVER IN PHYSICAL LAYER OF MOBILE INDUSTRY PROCESSOR INTERFACE (MIPI-PHY)

(71) Applicant: MStar Semiconductor, Inc., Hsinchu Hsien (TW)

(72) Inventors: Ju-Yu Yu, Hsinchu Hsien (TW); Kai-Fei Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 196 days.

(21) Appl. No.: 14/044,058

(22) Filed: Oct. 2, 2013

(65) Prior Publication Data

US 2014/0094128 A1   Apr. 3, 2014

(30) Foreign Application Priority Data

Oct. 2, 2012   (TW) .............................. 101136295 A

(51) Int. Cl.
*H04B 1/16* (2006.01)
*H04B 7/06* (2006.01)
*G06F 13/40* (2006.01)

(52) U.S. Cl.
CPC .............. *H04B 1/16* (2013.01); *G06F 13/4072* (2013.01)

(58) Field of Classification Search
CPC ...... H04B 1/16; H04B 1/1676; H04B 7/0641; H04B 10/677
See application file for complete search history.

(56) References Cited

U.S. PATENT DOCUMENTS

| | | | | |
|---|---|---|---|---|
| 2006/0271797 A1* | 11/2006 | Ginggen | ............... | G06F 1/3203 713/300 |
| 2009/0066546 A1* | 3/2009 | Yonezawa | ............. | H04L 7/0337 341/100 |
| 2009/0115495 A1* | 5/2009 | Nakai | ............. | 327/536 |
| 2009/0271677 A1* | 10/2009 | Tang et al. | ............. | 714/738 |
| 2011/0030064 A1* | 2/2011 | Kwak | ............. | G11C 7/1078 726/26 |
| 2011/0268198 A1* | 11/2011 | Nishioka et al. | ............. | 375/257 |
| 2011/0279167 A1* | 11/2011 | Fukuzumi | ...... | H03K 19/018528 327/434 |
| 2012/0155192 A1* | 6/2012 | Ryu | ............. | 365/189.05 |
| 2013/0225067 A1* | 8/2013 | Card | ............. | H04L 25/20 455/7 |

* cited by examiner

*Primary Examiner* — Andrew Wendell
(74) *Attorney, Agent, or Firm* — Edell, Shapiro & Finnan, LLC

(57) ABSTRACT

A receiver includes a control module, a data receiving circuit and a masking circuit. The control circuit generates an enable signal according to a pair of differential signals provided by a transmitter. Triggered by the enable signal, the data receiving circuits generates an output signal according to the differential signals, and the masking circuit starts masking the output signal. After generating the enable signal, the control module starts providing a bias voltage to the differential signals such that the output signal has a first state. The transmitter adjusts the differential signals to render the output signal to enter a second state from the first state. Upon detecting the output signal having entered the second state, the control module stops providing the bias voltage and generates a disable signal to prompt the masking circuit to stop masking the output signal.

4 Claims, 2 Drawing Sheets

RECEIVER IN PHYSICAL LAYER OF MOBILE INDUSTRY PROCESSOR INTERFACE (MIPI-PHY)

This application claims the benefit of Taiwan application Serial No. 101136295, filed Oct. 2, 2012, the subject matter of which is incorporated herein by reference.

BACKGROUND OF THE INVENTION

1. Field of the Invention

The invention relates in general to a data transmission technique, and more particularly, to a receiver in a physical layer of a Mobile Industry Processor Interface (MIPI-PHY).

2. Description of the Related Art

The Mobile Industry Processor Interface (MIPI) is an increasingly popular communication software/hardware interface standard in recent years, and is prevalent in products such as mobile electronic devices, digital cameras, display devices, portable tablets and laptop computers. In MIPI specifications, a physical layer serial interface commonly referred to as D-PHY provides a high-speed serial interface solution for communications between various components in an electronic device. The D-PHY solution is capable of expanding a bandwidth of a transmission interface through a low-power consumption approach.

For data transmission, the MIPI D-PHY specification defines two modes—a high-speed mode and a low-speed mode. In practice, a high-speed data receiving circuit and a low-power data receiving circuit at an MIPI D-PHY receiver share a pair of differential lines to receive messages from an MIPI transmitter. FIG. 1 shows a timing diagram of signals of the pair of differential transmission lines transmitting from a low-power mode to a high-speed mode. In FIG. 1, DP represents a positive end of the differential transmission lines, and the DN represents a negative end of the differential transmission lines. In the low-power mode (e.g., a period T0), both of the signals DP and DN are at a high-voltage level (1.2V). Before the MIPI transmitter is to exit the low-power mode and enter the high-speed mode to start transmitting data to the receiver, the signal DP is first reduced to a low-voltage level in a period (T1) and the signal DN is also reduced to a low-voltage level in a following period (T2). In a period T3, the transmitter needs to send high-speed differential signals 0 via the pair of differential transmission lines such that the signal DN is greater than the signal DP by 200 mV. In a period T4, the transmitter sends a synchronization signal for the reference of the receiver. After the period T4 ends, the transmitter starts transmitting real data contents.

According to MIPI D-PHY specifications, the receiver is required to enter the high-speed mode in period T2, i.e., a high-speed data receiving circuit at the receiver needs to starts operating. For the high-speed data receiving circuit, the signals DP and DN having a same voltage potential in the period T2 are invalid and unrecognizable signals. Also defined by the MIPI specifications, the receiver is required to ignore and mask the data received in the period T2. The period T3 may be regarded as a buffer zone of the masking period. More specifically, the receiver needs to mask at least the received data of the entire period T2, with a masking range covering a part of all of the period T3 but not the synchronization signal in the period T4.

A length of the above masking period has a lower limit of 85 ns+6*UI and an upper limit of 145 ns+10*UI, where ns represents nanoseconds, and UI represents a period of a clock signal adopted by the high-speed mode. In practice, a frequency of the clock signal changes with different settings, and a range of UI is between 1 ns and 12.5 ns. In order to correctly determine the length of the masking period, the MIPI receiver has to learn the value of UI. In current methods, the UI information is usually transmitted through hand-shaking between the transmitter and the receiver by means of software. However, in accordance with the above approach, a considerable amount of software resources are consumed, and unexpected situations, e.g., values incompliant with MIPI D-PHY specifications (e.g., when the UI length adopted at the transmitter exceeds 12 ns), usually cannot be handled.

SUMMARY OF THE INVENTION

The invention is directed to an MIPI D-PHY receiver. With the MIPI D-PHY receiver, without detecting or enquiring a transmitter for a period of a clock signal, time points for starting and ending a masking period are determined according to voltage characteristics of DP and DN signals. As such, not only complications of signal exchange by use of software can be eliminated but also unexpected situations where a transmitter adopts signal frequencies incompliant with MIPI D-PHY specifications can be adequately handled.

According to an embodiment of the present invention, a receiver is provided. The receiver comprises a control module, a data receiving circuit and a masking circuit. The control module generates an enable signal according to a pair of differential signals provided by a transmitter. Triggered by the enable signal, the data receiving circuit generates an output signal according to the differential signals, and the masking circuit starts masking the output signal. After the enable signal is generated, the control module starts providing a bias voltage to the differential signals so that the output signal has a first state. The transmitter adjusts the differential signals to render the output signal to enter a second state from the first state. Upon detecting that the output signal having entered the second state, the control module stops providing the bias voltage and generates a disable signal to prompt the masking circuit to stop masking the output signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
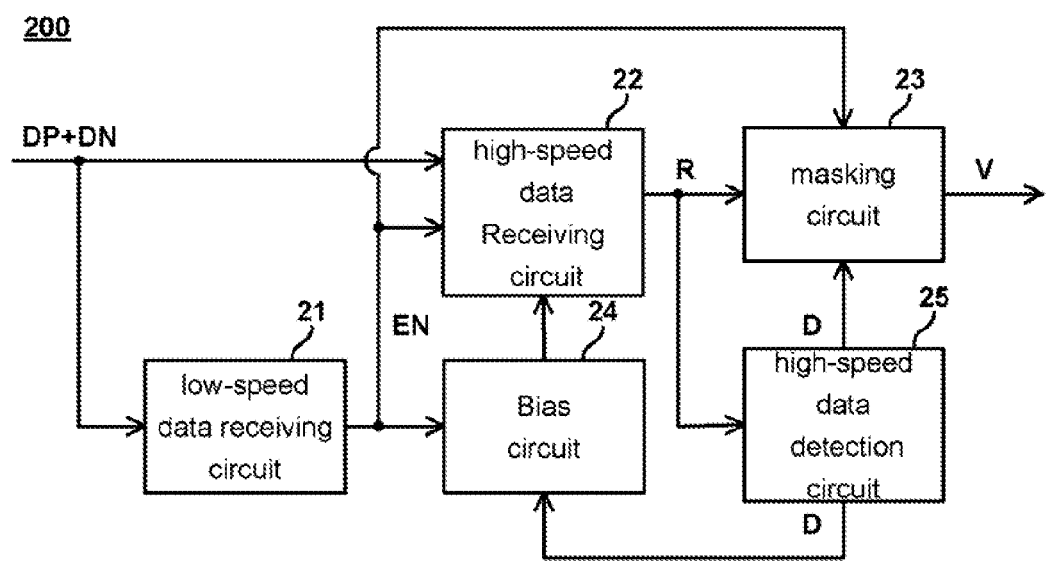
FIG. 2 is a block diagram of a receiver according to an embodiment of the present invention.

FIG. 2 shows a receiver 200 of a Mobile Industry Processor Interface physical layer (MIPI D-PHY) according to an embodiment of the present invention. The receiver 200 comprises a low-speed data receiving circuit 21, a high-speed data receiving circuit 22, a masking circuit 23, a bias circuit 24 and a high-speed data detection circuit 25. In practice, the receiver 200 may be integrated into various types of electronic devices (e.g., smart handsets, personal digital assistants, laptop computers, game consoles or portable pads), or may be an independent device. The several circuits depicted in FIG. 2 (and FIG. 3) may be embodied in hardware (and/or software). For example, the several circuits of receiver 200 may be embodied in an application specific integrated circuit (ASIC) configured to operate as described below.

As shown in FIG. 2, a pair of differential signals DP and DN are provided to the low-speed data receiving circuit 21 and the high-speed data receiving circuit 22, respectively. The low-speed data receiving circuit 21 determines a time point for generating an enable signal EN according to the signal DP and/or the signal DN. The enable signal EN instructs the high-speed data receiving circuit 22 to start operating, and instructs the masking circuit 23 to start masking an output signal R generated by the high-speed data receiving circuit 22. During the masking period, the masking circuit 23 is capable of maintaining an output signal V at a predetermined voltage that is unaffected by the signal R.

Figure 1:
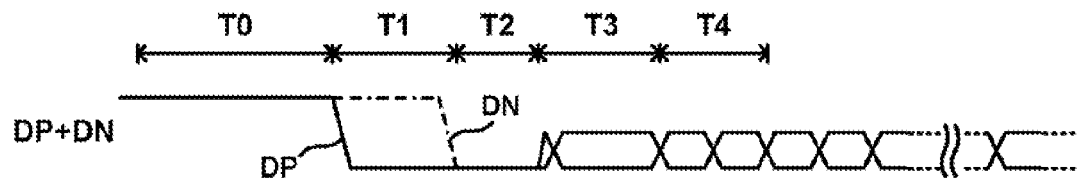
FIG. 1 is a timing diagram of MIPI differential signals transiting from a low-power mode to a high-speed mode.

Referring to the timing diagram in FIG. 1, for example, the low-speed data receiving circuit 21 may generate the enable signal EN upon detecting a falling edge (i.e., a starting point of the period T1) of the signal DP or a falling edge (i.e., an ending point of the period T1) of the signal DN. Alternatively, the low-speed data receiving circuit 21 may be designed to generate the enable signal EN upon detecting that a voltage difference between the signals DP and DN is greater than a threshold.

In addition to the high-speed data receiving circuit 22 and the masking circuit 23, the enable signal EN is also provided to the bias circuit 24. The enable signal EN instructs the bias circuit 24 to start providing a bias voltage to a DP signal line in the high-speed data receiving circuit 22. For example, the bias voltage may be 50 mV or 100 mV (i.e., increasing the voltage at the DP signal line to 50 mV or 100 mV). As previously described, the signal DP and the signal DN provided by the transmitter are both at a low-voltage level in the period T2. The purpose of the bias voltage is to allow the signal DP to have a voltage potential greater than that of the signal DN, such that the high-speed data detection circuit 25 detecting the output signal R of the high-speed receiving circuit 22 detects that the output signal R is maintained constant at logic "1" in the period T2.

As previously described, in period T3, the transmitter renders the signal DN to be greater than the signal DP by 200 mV. Thus, after entering period T3, the signal DN still becomes higher than the signal DP even in the presence of the bias voltage, in a way that the output signal R detected by the high-speed data detection circuit 25 transits from logic "1" to logic "0". After the transition, the high-speed data detection circuit 25 generates a disable signal D, which is provided to the masking circuit 23 as well as the bias circuit 24. The disable signal D is used to allow the masking circuit 23 to stop masking the output signal R, and prompts the bias circuit 24 to stop providing the bias voltage to the high-speed data receiving circuit 22. It should be noted that an operation range of the disable signal D is not opposite to that of the foregoing enable signal EN.

In the presence of the disable signal D, the output signal R of the high-speed data receiving circuit 22 returns to a state that is unaffected by the bias voltage, and the masking circuit 23 directly regards the output signal R as the output signal V that is further provided to a subsequent circuit.

In practice, an upper limit of the above bias voltage may be determined by voltage amplitude of the signals DP and DN in the high-speed state. More specifically, the bias voltage cannot reach a value which causes a determination result of the high-speed data detection circuit 25 to transit to logic "0" from logic "1" after the transmitter applies 200 mV to the DN signal.

On the other hand, the bias voltage should be sufficient such that when the bias voltage is applied to the signal DP, the high-speed data detection circuit 25 has a determination result of logic "1".

In the embodiment, the starting time point of the masking period is determined by the low-speed data receiving circuit 21, and an ending time point is determined by the high-speed data detection circuit 25. It is apparent that the above approach is capable of effectively masking the output signal R in the masking period and stopping of masking the output signal R before the period T4 begins. In one embodiment, the low-speed data receiving circuit 21 is designed to generate the enable signal EN when a falling edge occurs in the signal DN, and the high-speed data detection circuit 25 is designed to immediately send out the disable signal D upon detecting that the output signal R transits from logic "1" to logic "0". As such, the operation period of the bias circuit 24 is shortened as much as possible to reduce power consumption.

It should be noted that, instead of directly providing the above bias voltage to the DP signal line, the bias voltage may also be provided to a particular circuit node in the high-speed data receiving circuit 22. Given that the bias voltage is capable of maintaining the output signal R of the high-speed data receiving circuit 22 as logic "1" in the period T2 as well as transiting the output signal R to logic "0" in period T3 under the influence of the transmitter, the foregoing effects can be achieve.

Figure 3:
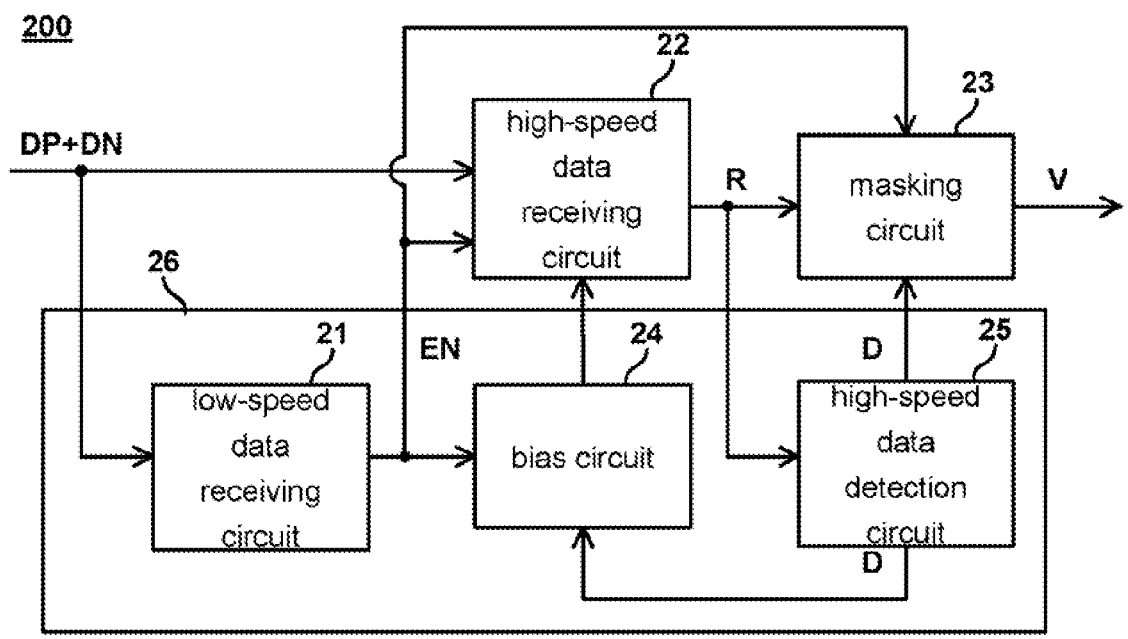
FIG. 3 is a block diagram of a receiver according to another embodiment of the present invention.

As shown in FIG. 3, in another embodiment, functions of the low-speed data receiving circuit 21, the bias circuit 24 and the high-speed data detection circuit 25 may be integrated into a control module 26. It can be easily appreciated by a person having ordinary skill in the art that, rather than being implemented by a low-speed data receiving circuit in an MIPI receiver, the task of generating the enable signal EN according to the signals DP and DN may also be handled by another detection circuit.

As demonstrated by the above descriptions, with the MIPI D-PHY receiver 200, without detecting or enquiring a transmitter for a period (i.e., a value of UI) of a clock signal, time points for starting and ending a masking period are determined according to voltage characteristics of DP and DN signals. Therefore, not only can complications of signal exchange by use of software be eliminated but unexpected situations where a transmitter adopts signal frequencies incompliant to MIPI D-PHY specifications can also be adequately handled.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, for receiving a pair of differential signals provided by a transmitter, comprising:
a control module, configured to generate an enable signal and provide a bias voltage when a predetermined change occurs in the differential signals, the control circuit comprising a low-speed data receiving circuit that generates the enable signal;
a high-speed data receiving circuit, triggered by the enable signal to generate an output signal according to the differential signals and the bias voltage; and
a masking circuit, triggered by the enable signal to start masking the output signal;

wherein, when the control module provides the bias voltage, the output signal is in a first state wherein one of the pair of differential signals is maintained high by the bias voltage and the other one of the pair of differential signals is low; upon detecting that the output signal enters a second state from the first state, wherein the other of the pair of differential signals is high, caused by the transmitter, the control module stops providing the bias voltage and generates a disable signal to the masking circuit to prompt the masking circuit to stop masking the output signal, wherein the first state and the second state are in accordance with the Mobile Industry Processor Interface (MIPI).

2. The receiver according to claim 1, wherein the pair of differential signals comprises a positive-end signal and a negative-end signal, and the control module provides the bias voltage to the positive end signal.

3. The receiver according to claim 1, wherein the control module provides the bias voltage to the high-speed data receiving circuit.

4. The receiver according to claim 1, wherein the control module comprises:
 a bias circuit, triggered by the enable signal to start providing the bias voltage; and
 a detection circuit, configured to detect the output signal and generate the disable signal when the output signal enters the second state.

* * * * *